Figure 1:
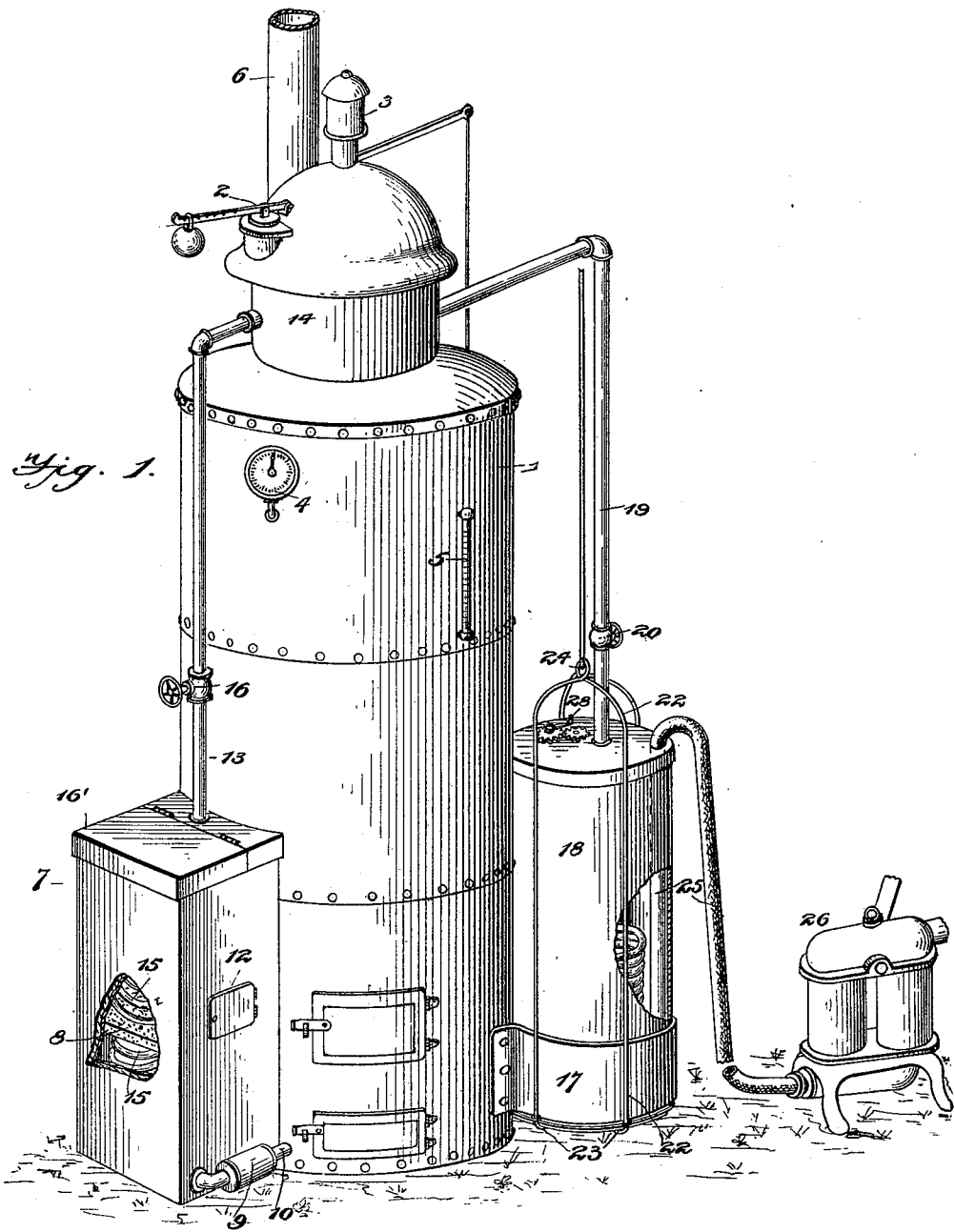

No. 622,364. Patented Apr. 4, 1899.
E. HUBBELL.
STEAM GENERATOR FOR THAWING FROZEN GROUND.
(Application filed Mar. 8, 1898.)

(No Model.) 2 Sheets—Sheet 1.

Witnesses
C. E. Hunt.

Inventor
Edwin Hubbell
by H. B. Willson & Co
Attorney

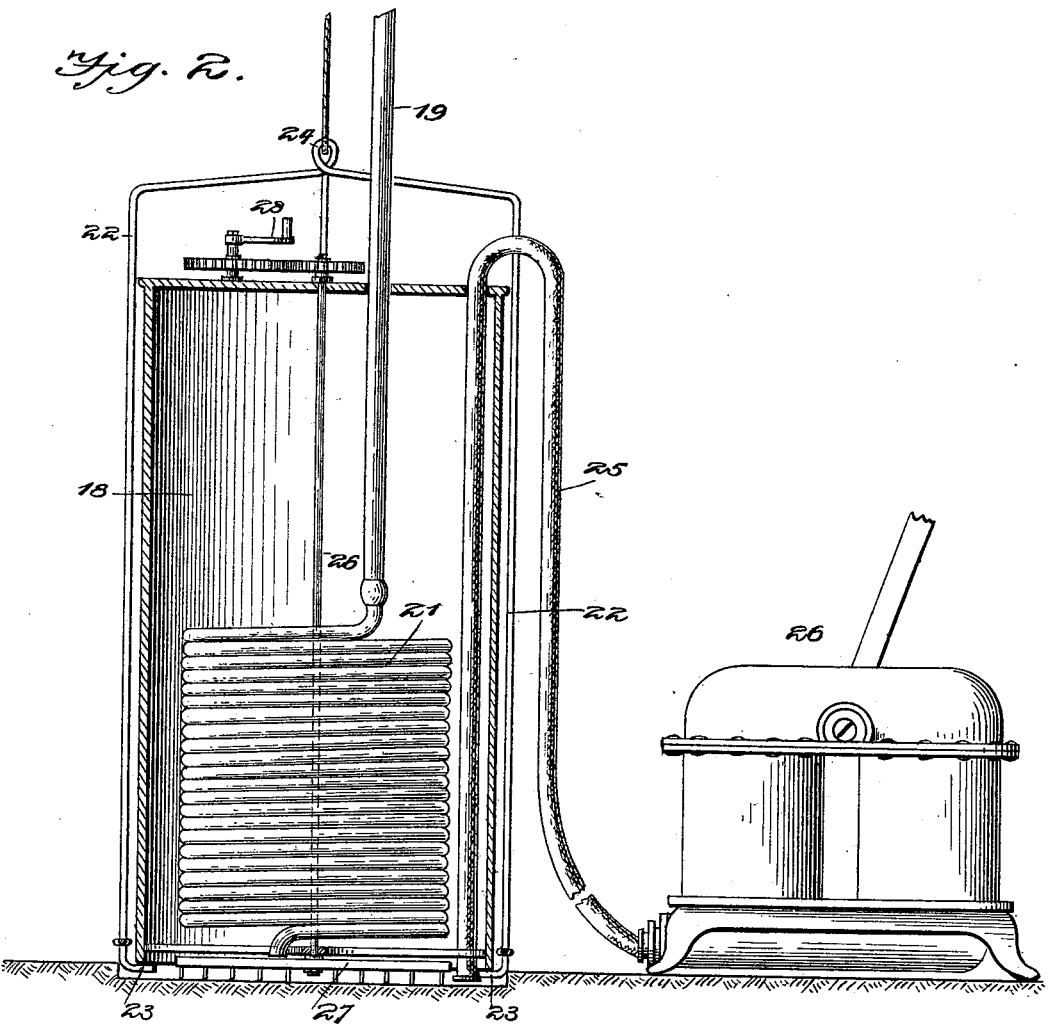

UNITED STATES PATENT OFFICE.

EDWIN HUBBELL, OF SOUTH OMAHA, NEBRASKA, ASSIGNOR OF ONE-HALF TO ADAMANTINE JOHNSON, JR., OF WATSON, MISSOURI.

STEAM-GENERATOR FOR THAWING FROZEN GROUND.

SPECIFICATION forming part of Letters Patent No. 622,364, dated April 4, 1899.

Application filed March 8, 1898. Serial No. 673,027. (No model.)

*To all whom it may concern:*

Be it known that I, EDWIN HUBBELL, a citizen of the United States, residing at South Omaha, in the county of Douglas and State of Nebraska, have invented certain new and useful Improvements in Steam-Generators for Thawing Frozen Ground; and I do declare the following to be a full, clear, and exact description of the invention, such as will enable others skilled in the art to which it appertains to make and use the same.

My invention relates to improvements in steam-generators for thawing frozen ground; and the object is to provide a simple, practical, and effective device for thawing the frozen ground for the purpose of excavating, and more particularly in mining operations, so that the same may be successfully carried on during the winter season.

To this end the invention consists in the construction, combination, and arrangement of the device, as will be hereinafter more fully described, and particularly pointed out in the claim.

The accompanying drawings show my invention in the best form now known to me; but many changes in the details might be made within the skill of a good mechanic without departing from the spirit of my invention as set forth in the claim at the end of this specification.

The same reference characters indicate the same parts of the invention.

Figure 1 is a perspective view of my improved steam-generator thawing device with parts broken away to more clearly show certain parts. Fig. 2 is a detail view of the longitudinally-expansible thawing-coil, its protecting-hood, elevator-cage, and mud-pump.

1 denotes a portable upright boiler, which may be of any approved type, the only requirement being that it be a quick and rapid steamer and capable of generating steam in large volumes, and it is provided with the usual attachments for safety and convenience, among which the safety-valve 2, alarm-whistle 3, the steam-gage 4, water-gage 5, smoke-stack 6, and feed-water tank 7 may be noted. The feed-water tank 7 is provided with a horizontal diaphragm 8 of any suitable filtering medium, and 9 denotes an injector or pump arranged in a feed-pipe 10, which connects the lower end of the feed-water tank with the boiler, so that the filtered feed-water may be fed to the boiler as required.

12 denotes a trap or hand-hole plate arranged above the filter to remove the foreign matter from the tank, and 13 represents a live-steam pipe extending from the steam-dome 14 of the boiler and terminating in a pipe-coil 15, arranged in the tank partly above and partly below the filter 8, and it is provided with a globe-valve 16 for regulating the supply of steam to the feed-water tank. The lower end of the coil 15, terminating in the filtered-water chamber, is open, so as to utilize the exhaust-steam to heat the filtered feed-water. Snow and ice are thrown in the feed-water tank, the steam-coil 15 reducing the same to a liquid, which then passes through the filter 8, so as to separate the earth, sand, and gravel, or other foreign matter and permit only the clear filtered water to be fed to the boiler.

16 represents an asbestos-packed cover hinged to the top of the water-tank, and the body of the tank is also provided with an asbestos or other protecting covering for retaining the heat in the feed-water tank.

17 denotes a cylindrical guard or guide strap fixed to the lower end of the boiler, and 18 represents a cylindrical hood having a vertical movement in said strap, the lower end of said hood being open and the upper end closed and provided with an orifice for the passage of a live-steam pipe 19, which communicates with the steam-drum of the boiler, as shown, and it is provided with a globe-valve 20 to control the flow of steam. The lower end of the live-steam pipe 19 within the hood connects with the upper end of a lead or other flexible-metal pipe-coil 21, the lower end of which opens in the hood. 22 denotes a cylindrical cage loosely encompassing said hood, and its lower end terminates in a series of claws 23 23, upon which the lower edge of the hood and the bottom coil of the pipe 21 rest, so that when the cage is lowered into the ground the hood will descend with it and the lead-pipe coil 21 will expand and follow the hood.

24 represents an eye formed on the upper end of the cage for receiving a hoisting-rope extending from a windlass or "block and fall" for conveniently raising and lowering it.

25 denotes a rubber or other flexible suction-pipe having its lower end fixed to the inside of the hood, and its upper end is connected to a sand or mud pump 26 for removing the soft earth or mud from the pit.

27 denotes a rotary rake or agitator journaled in the hood and adapted to be vertically adjusted and simultaneously rotated by the crank 28 to loosen up the thawed earth, which is thus readily removed by the mud-pump 26.

The operation of the device will be readily understood from the foregoing, taken in connection with the drawings.

Having thus fully described my invention, what I claim as new and useful, and desire to secure by Letters Patent of the United States, is—

A portable mining device comprising a steam-generator, a longitudinally-expansible live-steam pipe-coil, a hood encompassing said coil, and a cage encompassing said coil and hood and means for simultaneously raising or lowering said coil, hood and cage, as and for the purpose set forth.

In testimony whereof I have hereunto set my hand in presence of two subscribing witnesses.

EDWIN HUBBELL.

Witnesses:
BENJAMIN F. GUDE,
INNIS N. LEWIS.